(12) United States Patent
Takahashi et al.

(10) Patent No.: US 9,219,404 B2
(45) Date of Patent: Dec. 22, 2015

(54) WASTE HEAT POWER GENERATOR

(75) Inventors: Toshio Takahashi, Tokyo (JP); Hirohisa Wakisaka, Naka-gun (JP)

(73) Assignee: IHI CORPORATION (JP)

( * ) Notice: Subject to any disclaimer, the term of this patent is extended or adjusted under 35 U.S.C. 154(b) by 199 days.

(21) Appl. No.: 13/814,327

(22) PCT Filed: Aug. 18, 2011

(86) PCT No.: PCT/JP2011/068686
§ 371 (c)(1),
(2), (4) Date: Feb. 5, 2013

(87) PCT Pub. No.: WO2012/029553
PCT Pub. Date: Mar. 8, 2012

(65) Prior Publication Data
US 2013/0127179 A1    May 23, 2013

(30) Foreign Application Priority Data

Sep. 1, 2010  (JP) ................................ 2010-195749

(51) Int. Cl.
| | |
|---|---|
| *F01K 13/02* | (2006.01) |
| *F01M 1/00* | (2006.01) |
| *H02K 99/00* | (2014.01) |
| *F01D 25/12* | (2006.01) |
| *F02C 6/18* | (2006.01) |
| *F01K 13/00* | (2006.01) |

(52) U.S. Cl.
CPC ............ *H02K 57/003* (2013.01); *F01D 25/125* (2013.01); *F01K 13/00* (2013.01); *F02C 6/18* (2013.01)

(58) Field of Classification Search
CPC ..... H02K 57/003; F01K 13/00; F01D 25/125; F02C 6/18
USPC .................................. 60/646, 657, 670; 184/6
See application file for complete search history.

(56) References Cited

U.S. PATENT DOCUMENTS

| 2,073,771 A | * | 3/1937 | Wilson ............................. 62/502 |
| 4,049,972 A | * | 9/1977 | Crowdy et al. .................. 290/52 |
| 2008/0159891 A1 | * | 7/2008 | Schulze et al. ................. 417/572 |

FOREIGN PATENT DOCUMENTS

| CN | 101120178 A | 2/2008 |
| JP | 2-030914 | 2/1990 |
| JP | 7-139640 | 5/1995 |

(Continued)

OTHER PUBLICATIONS

German Office Action, dated Jun. 13, 2014 issued in corresponding German Patent Application No. 112011102904.7. English Translation. Total 12 pages.

(Continued)

*Primary Examiner* — Hoang Nguyen
(74) *Attorney, Agent, or Firm* — Ostrolenk Faber LLP

(57) ABSTRACT

This waste heat power generator (G) includes: an evaporator (1) to recover heat energy and to produce a vapor of a working medium; a power-generating device (2) to generate electric power while expanding the vapor; a condenser (3) to condense the vapor which has passed through the power-generating device; a pump (4) to send the working medium which has been condensed at the condenser to the evaporator; and a grease supply device (5) to supply the power-generating device with a grease used to lubricate bearings provided in the power-generating device.

12 Claims, 5 Drawing Sheets

(56) References Cited

FOREIGN PATENT DOCUMENTS

| | | |
|---|---|---|
| JP | 8-218816 | 8/1996 |
| JP | 11-190270 | 7/1999 |
| JP | 2000-110514 | 4/2000 |
| JP | 2005-291108 | 10/2005 |
| JP | 2007-120698 | 5/2007 |
| JP | 4311982 | 8/2009 |
| JP | 2010-164043 | 7/2010 |

OTHER PUBLICATIONS

Berthold Schlecht "Maschinenelemente 2. Getriebe—Verzahnungen—Lagerungen" Munchen: Pearson Stadium (2010), pp. 161-163. Fig. 15.33. ISBN 978-3-8273-7146-1. English Translation. Total 6 pages.

International Search Report and Written Opinion mailed Sep. 20, 2011 in corresponding PCT International Application No. PCT/JP2011/068686.

Chinese Office Action, dated May 5, 2014, issued in corresponding to Chinese Patent Application No. 201180037755.3, filed Aug. 18, 2011, including English translation of Search Report. Total 9 pages.

Chinese Office Action mailed Nov. 28, 2014 in corresponding Chinese Patent Application No. 201180037755.3 and the attached Search Report, along with an English language translation thereof.

\* cited by examiner

WASTE HEAT POWER GENERATOR

CROSS-REFERENCE TO RELATED APPLICATIONS

The present application is a 35 U.S.C. §§371 national phase conversion of PCT/JP2011/068686, filed Aug. 18, 2011, which claims priority of Japanese Patent Application No. 2010-195749, filed Sep. 1, 2010, the contents of which are incorporated herein by reference. The PCT International Application was published in the Japanese language.

TECHNICAL FIELD

The present invention relates to a waste heat power generator to generate electric power using heat energy.

BACKGROUND ART

In the related art, heat energy (waste heat) released from factories, incineration facilities or the like is recovered so as to perform electric power generation, and the electric energy obtained by this electric power generation is reused, thereby advancing the energy saving. In these factories or facilities, the waste heat of about 300 degrees C. or more (near 1000 degrees C. in some cases) is used to drive a power generator for the power generation because high-pressure vapor can be easily produced, and much of the low-temperature waste heat of about 300 degrees C. or less is still released into the atmosphere. Thus, if the low-temperature waste heat which has been hardly recovered in the related art is recovered so as to perform power generation, it is thought that further energy saving can be achieved.

Japanese Unexamined Patent Application, First Publication No. 2000-110514, (hereinafter "JP 2000-110514"), described below discloses a waste heat power generator to generate electric power using the heat energy of the low-temperature waste heat of 300 degrees C. or less, by a Rankine cycle using a low-boiling working medium. Japanese Examined Patent Application, Second Publication No. 4311982, (hereinafter "JP 4311982"), described below discloses a turbine generator adapted to the waste heat power generator described in JP 2000-110514, the turbine generator including a generator directly connected to a turbine, and a lubricating device to circulate lubricating oil and to lubricate bearings supporting rotors of the turbine and generator.

SUMMARY OF INVENTION

Technical Problem

Electric power generation using the heat energy of low-temperature waste heat can be performed as long as there is the Rankine cycle using the low-boiling working medium described in JP 2000-110514. In a case of using the low-temperature waste heat, since a temperature difference is small, the energy recovery efficiency at the Rankine cycle is low. Accordingly, for recovering the electric power from the low-temperature waste heat, it is required that the costs of devices be reduced in view of economic practicability. From the viewpoint of reducing the costs, it is necessary to provide only devices involved directly with the Rankine cycle (specifically, a waste heat recovery unit to produce vapor by the heat energy of low-temperature waste heat, a turbine generator driven by the vapor, a condenser to condense and liquefy the vapor which has passed through the turbine generator, a pump to circulate a low-boiling working medium, and the like), and to omit collateral devices not directly involved with the Rankine cycle as far as possible.

JP 4311982 discloses a turbine generator adapted to the waste heat power generator described in JP 2000-110514. However, since it is necessary to circulate the lubricating oil, an ejector, a lubricating oil tank, a liquid-sending pump, pipes and the like are required. As a result of this, the number of collateral devices not directly involved with the Rankine cycle is increased, so that the configuration thereof is complicated and the costs thereof are increased.

The present invention has been made in view of the above circumstances, and aims to provide a waste heat power generator able to efficiently generate electric power using the heat energy of low-temperature waste heat, without complicating its configuration and increasing its costs.

Solution to Problem

According to the present invention, a waste heat power generator (G) includes: an evaporator (1) to recover heat energy and to produce a vapor of a working medium; a power-generating device (2) to generate electric power while expanding the vapor; a condenser (3) to condense the vapor which has passed through the power-generating device; a pump (4) to send the working medium which has been condensed at the condenser to the evaporator; and a grease supply device (5) to supply the power-generating device with a grease used to lubricate bearings provided in the power-generating device.

In this case, it is preferable that the working medium be a medium whose boiling point is higher than or equal to 35 degrees C., and a pressure inside the waste heat power generator in operation be lower than or equal to 1 MPa by a gauge pressure.

The power-generating device may include: an impeller (11) rotationally driven by the vapor; a generator (12) driven by a rotational driving force of the impeller, so as to generate electric power; a rotary shaft (13) to transmit the rotational driving force of the impeller to the generator; bearings (14a, 14b) rotatably supporting the rotary shaft; and a casing (15) which accommodates at least the generator and the rotary shaft, and which is provided with a grease channel (18, 19, 30) to supply the bearings with the grease from the grease supply device.

The grease channel may include: an annular channel (18a) being formed annularly around a rotational axis of the rotary shaft; and a channel (18, 19) in which one end thereof communicates with the annular channel and the other end thereof communicates with a grease supply port (C1, C2) of the grease supply device.

One end of the grease channel may be arranged in a side of a lateral surface of the bearings, and the other end of the grease channel may communicate with a grease supply port of the grease supply device.

The grease channel may be formed in an L-shape.

It is preferable that the casing have a sealed structure, and the grease supply device pressure the grease with a pressure which exceeds an internal pressure in the casing, so as to supply the grease to the power-generating device.

The waste heat power generator may further include a controller to control the grease supply device, and the controller may control the grease supply device so as to periodically supply a fixed amount of grease to the power-generating device.

The controller may adjust a supply amount of the grease supplied by the grease supply device based on an electric output of the power-generating device.

Effects of Invention

According to the present invention, since the bearings provided in the power-generating device are lubricated using the grease supplied from the grease supply device, and the configuration to circulate lubricating oil in the related art is not required, it is possible to efficiently generate electric power using the heat energy of low-temperature waste heat, without complicating its configuration and increasing its costs.

In addition, since the pressure inside the waste heat power generator is retained low in order to supply grease stably, a high-pressure is not applied to the casing of the power-generating device, the evaporator or the condenser, and it is possible to also manufacture the waste heat power generator which is safe and whose costs are retained low.

DESCRIPTION OF EMBODIMENTS

Figure 1:
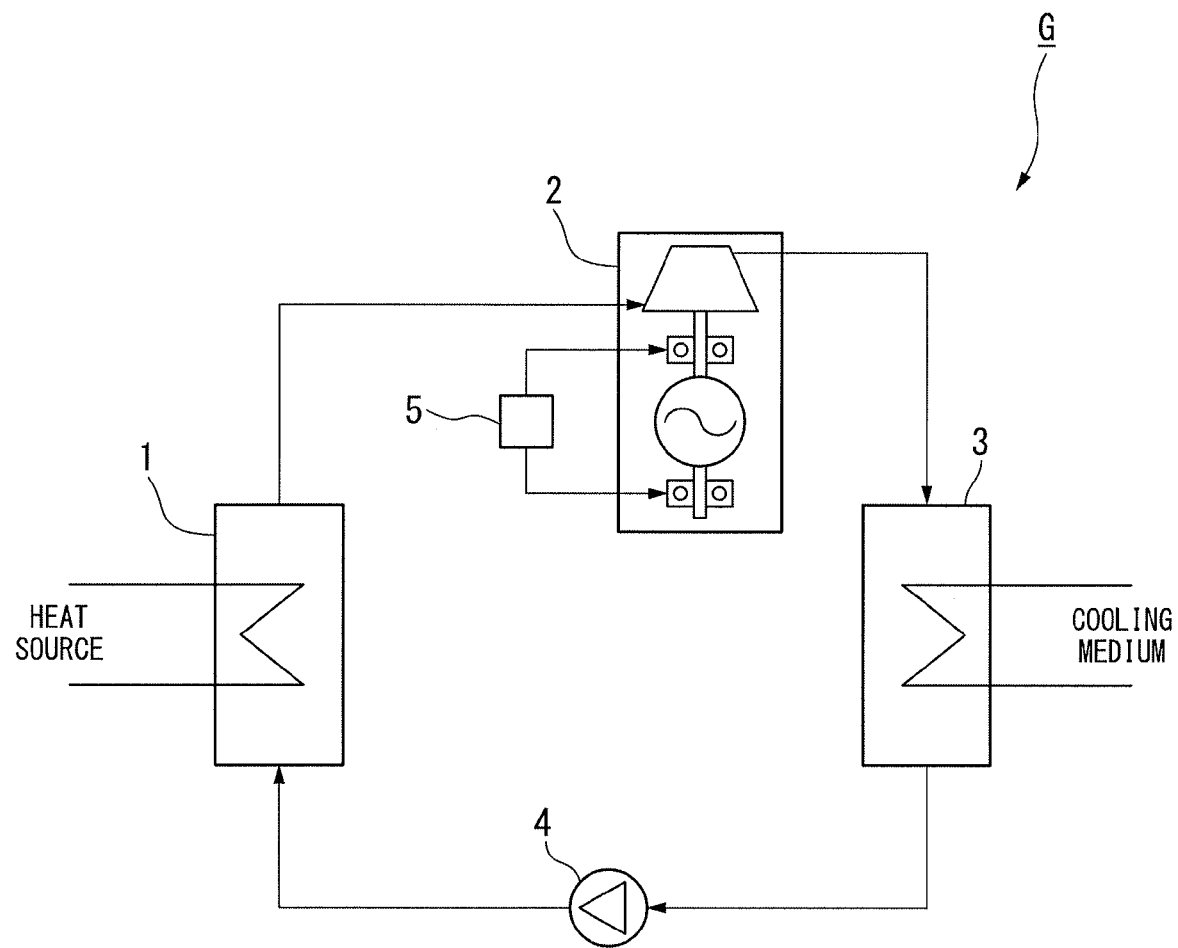
FIG. 1 is a block diagram schematically showing an overall configuration of a waste heat power generator in an embodiment of the present invention.

A waste heat power generator in an embodiment of the present invention is described below with reference to the drawings. FIG. 1 is a block diagram schematically showing an overall configuration of a waste heat power generator in an embodiment of the present invention. As shown in FIG. 1, a waste heat power generator G in this embodiment is a power generator including an evaporator 1, a turbine generator 2 (power-generating device), a condenser 3, a pump 4, and a grease supply device 5, and the power generator uses a Rankine cycle. The waste heat power generator G generates electric power using the heat energy of the low-temperature waste heat (described as "heat source" in FIG. 1) of about 300 degrees C. or less released from factories, incineration facilities or the like.

The evaporator 1 recovers the low-temperature waste heat released from factories or the like, and produces vapor of a working medium. The turbine generator 2 generates electric power while expanding the vapor produced by the evaporator 1. In addition, the detailed structure of the turbine generator 2 will be described later. The condenser 3 cools the vapor which has passed through the turbine generator 2 using a cooling medium such as a coolant, and thereby condenses the vapor. The pump 4 pressures the working medium which has been condensed at the condenser 3, and sends the working medium to the evaporator 1.

The grease supply device 5 supplies the turbine generator 2 with grease used to lubricate bearings provided in the turbine generator 2. Lubricating oil is not used to lubricate the bearings but the grease is used, in order to simplify the configuration thereof as far as possible and to prevent the costs thereof from increasing. That is, in a case of using lubricating oil, it is necessary to circulate the lubricating oil, thereby causing the configuration to be complicated and the costs to increase. By using grease not necessary to be circulated, the simplification of the configuration and the reduction of the costs are advanced.

As the working medium used in the waste heat power generator G having the above configuration, it is preferable that a medium whose boiling point (boiling point under the atmospheric pressure) is higher than 35 degrees C. be used, and a maximum pressure inside the waste heat power generator in operation be lower than or equal to 1 MPa (G) (1 MPa by the gauge pressure). The reason for this is to enable the vapor to be produced using the low-temperature waste heat, in order to generate electric power using the heat energy of the low-temperature waste heat of about 300 degrees C. or less. In addition, by retaining the pressure of the whole waste heat power generator low, it is possible to retain the internal pressure in the turbine generator 2 low, and to prevent the separation of the grease (separation into base oil and thickener) which is supplied from the grease supply device 5 to the turbine generator 2. This enables the turbine to be stably driven without using a complicated lubricating oil structure but low-cost grease lubrication.

In addition, since the pressure inside the waste heat power generator is retained low in order to stably supply grease, so that a high-pressure is not applied to the casing of the turbine generator 2, the evaporator 1 or the condenser 3, it is possible to manufacture the waste heat power generator G which is safe and whose costs are retained low. As a concrete working medium, hydrofluoroether (HFE), fluorocarbon, fluoroketone, perfluoropolyether or the like can be used.

In the waste heat power generator G having the above configuration, when the working medium is sent to the evaporator 1 by the pump 4, the working medium is boiled and evaporated by the heat energy of the low-temperature waste heat (heat source) delivered to the evaporator 1, thereby producing the vapor of the working medium. The vapor produced at the evaporator 1 is supplied to the turbine generator 2, and drives the turbine generator 2 while expanding itself, whereby electric power generation is performed at the turbine generator 2. The vapor which has passed through the turbine generator 2 is cooled by the cooling medium at the condenser 3, so as to be condensed. The working medium condensed by the condenser 3 is pressured by the pump 4 and is sent to the evaporator 1 again. In this way, the working medium is repeatedly evaporated and condensed in the waste heat power generator G, whereby electric power generation is performed using the heat energy of the low-temperature waste heat.

Figure 2:
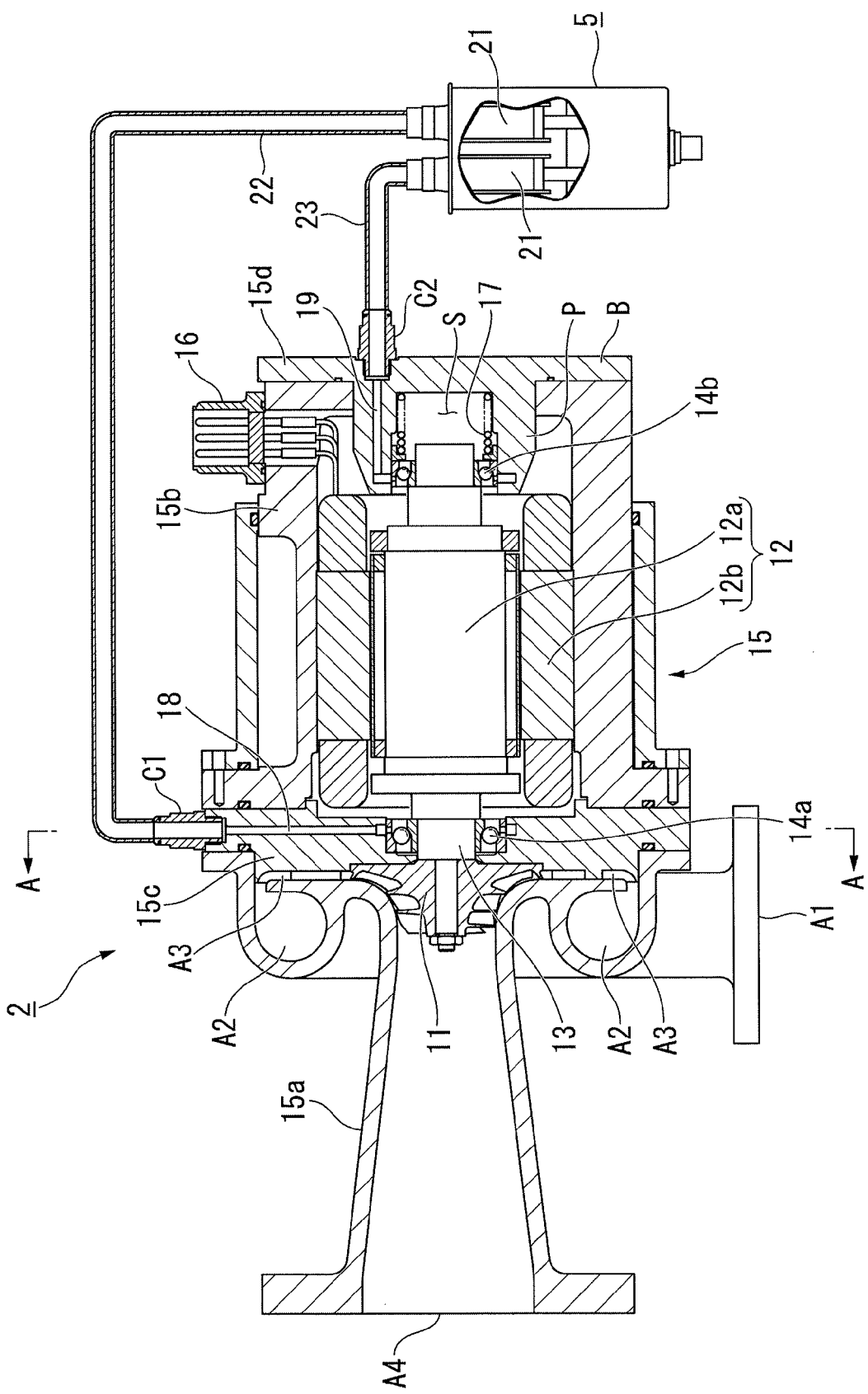
FIG. 2 is a view showing structures of a turbine generator and a grease supply device provided in the waste heat power generator in the embodiment of the present invention.

Next, the turbine generator 2 and the grease supply device 5 provided in the waste heat power generator G are described in detail. FIG. 2 is a view showing structures of a turbine generator and a grease supply device provided in the waste heat power generator in this embodiment of the present invention. In FIG. 2, the turbine generator 2 is shown in a cross-sectional side view, and the grease supply device 5 is shown in a side view with a part thereof cut out. The grease supply device 5 only has to be disposed in the vicinity of the turbine generator 2, and is not necessary to be attached to the turbine generator 2.

As shown in FIG. 2, the turbine generator 2 includes an impeller 11, a generator 12, a rotary shaft 13, bearings 14a, 14b, and a casing 15. The impeller 11 is a rotary vane rotationally driven by the vapor produced at the evaporator 1. Specifically, the impeller 11 is rotationally driven by the vapor supplied from the outside in the radial direction thereof, and sends out the expanded vapor from one side in the axial direction thereof.

The generator 12 is driven by a rotational driving force of the impeller 11, and generates, for example, three-phase alternate-current. Specifically, the generator 12 includes a rotor 12a having permanent magnets which are arranged along an external periphery of the rotor, and a stator 12b having coils which are arranged on an internal periphery of the generator so as to face the external periphery of the rotor 12a. The rotor 12a is driven by the rotational driving force of the impeller 11, and a relative position between the rotor 12a and the stator 12b around the rotational axis thereof is changed, so that electric power generation is performed.

The rotary shaft 13 is a shaft member to transmit the rotational driving force of the impeller 11 to the generator 12. This rotary shaft 13 is disposed so as to extend in the rotational axis direction of the impeller 11, and is inserted into the rotor 12a of the generator 12 and fixed thereto. The impeller 11 is fixed to one end of the rotary shaft 13 by a fastening screw or the like. Accordingly, the impeller 11, the rotor 12a of the generator 12, and the rotary shaft 13 integrally rotate around the rotational axis.

The bearings 14a, 14b are provided in the casing 15, and support the rotary shaft 13 rotatably. That is, the rotary shaft 13 is rotatably supported by the casing 15 through the bearings 14. These bearings 14a, 14b are rolling bearings, and are angular contact ball bearings in detail. In addition, the bearings 14 are not limited to the angular contact ball bearings, but deep groove ball bearings, tapered roller bearings or the like may be used which can support both a radial load and an axial load.

The bearings 14a support one end side of the rotary shaft 13 to which the impeller 11 is fixed, and the bearings 14b support the other end side of the rotary shaft 13. To each of these bearings 14a, 14b, the grease from the grease supply device 5 is supplied. This grease maintains smooth rotation of the bearings 14a, 14b. In addition, the detailed grease supply method to the bearings 14a, 14b will be described later.

The casing 15 accommodates the impeller 11, the generator 12, and the rotary shaft 13, and forms the external shape of the turbine generator 2. This casing 15 includes a scroll casing 15a, a casing body 15b, and bearing support parts 15c, 15d. The scroll casing 15a is provided with an intake A1, a scroll chamber A2, a nozzle A3, and an outlet A4, and is disposed so as to surround one side of the impeller 11.

The inlet A1 is a part to which the vapor is supplied, the vapor being produced by the evaporator 1 and used to rotationally drive the impeller 11. The scroll chamber A2 is formed annularly so as to surround the impeller 11, and is a channel in which one end thereof is connected to the inlet A1 and the other end thereof communicates with the nozzle A3. The nozzle A3 is formed annularly so as to surround the impeller 11, and is a channel to which the vapor which has passed through the scroll chamber A2 is supplied. In addition, an expansion turbine can be composed without a nozzle. The outlet A4 is a part through which the expanded vapor after rotationally driving the impeller 11 is released to the outside.

The casing body 15b is an approximately cylindrical member accommodating the generator 12 and the rotary shaft 13. This casing body 15b is provided with a connector 16 to output the electric power generated at the turbine generator 2 to the outside. A cable (not shown) is connected to the connector 16 from the outside of the turbine generator 2, whereby the electric power generated at the turbine generator 2 is outputted through the cable to the outside. The coils provided each in the connector 16 and the stator 12b are connected to each other via a predetermined wiring.

Since the vapor is supplied to the turbine generator 2, and the casing 15 has to have a sealed structure, a hermetic connector able to seal a connection part is used as the connector 16. The internal pressure in the waste heat power generator preferably is lower than 1 MPa (G). The reason for this is to prevent the separation of the grease supplied from the grease supply device 5 to the turbine generator 2. If adopting a hermetic structure, generally, the internal pressure in the casing becomes approximately the intermediate pressure between the inlet pressure (pressure at the inlet A1) of the turbine and the outlet pressure (pressure at the outlet A4). Thus, the maximum pressure inside the waste heat power generator in operation is lower than or equal to 1 MPa (G), whereby the internal pressure in the casing can be lower than 1 MPa (G).

The bearing support part 15c is formed in a circular plate shape, which supports the bearings 14a. The scroll casing 15a is detachably attached to one side surface of the bearing support part 15c using fastening bolts or the like, and the casing body 15b is detachably attached to the other side surface thereof using fastening bolts or the like. The bearings 14a are disposed at the central part of the bearing support part 15c, and the rotary shaft 13 is rotatably supported by the bearings 14a so that the rotary shaft 13 penetrates the bearing support part 15c.

The bearing support part 15d is formed in a bottomed cylindrical shape, which supports the bearings 14b. A bottom part B of the bearing support part 15d is detachably attached to the casing body 15b using fastening bolts or the like, at the opposite side to the side in which the bearing support part 15c is attached, so that a cylindrical part P thereof is disposed inside the casing body 15b. The bearings 14b are arranged in the vicinity of an opening of a space S inside the cylindrical part P of the bearing support part 15d, and the rotary shaft 13 is rotatably supported by the bearings 14b so that a part of the rotary shaft 13 is inserted into the space S.

A preloaded spring 17 to press the bearings 14b toward the bearings 14a is provided in the space S of the bearing support part 15d. Since the bearings 14b are connected to the bearings 14a via the rotary shaft 13, the pressure of the preloaded spring 17 is transmitted to not only the bearings 14b but the bearings 14a, and the pressure of the preloaded spring 17 in the rotational axis direction is applied to both of the bearings 14a, 14b. As described above, since the bearings 14a, 14b are angular contact ball bearings, when the proper preload is applied in the rotational axis direction, rolling elements (balls) are held in their proper positions, and vibration, noise or the like in rotation is reduced.

The bearing support parts 15c, 15d are provided with grease channels 18, 19 (channel) to supply grease to the bearings 14a, 14b, respectively. The grease channel 18 being formed in the bearing support part 15c is a channel in which one end thereof is arranged in the vicinity of an outer periphery of the bearings 14a which are disposed at the central part of the bearing support part 15c, and the other end thereof communicates with a grease supply port C1 provided on an outer periphery of the bearing support part 15c. On the other hand, the grease channel 19 being formed in the bearing support part 15d is a channel in which one end thereof is arranged in the vicinity of an outer periphery of the bearings 14b which are disposed in the space S inside the cylindrical part P of the bearing support part 15d, and the other end thereof communicates with a grease supply port C2 provided in the bottom part B of the bearing support part 15d.

The grease supply device 5 is disposed at the outside of the casing 15, and supplies grease to the bearings 14a, 14b. A pair of syringes 21 which are filled with grease are accommodated at the inside of the grease supply device 5. In addition, a drive unit (not shown) to make the syringes 21 operate is provided at the inside of the grease supply device 5, and the syringes 21 are operated by actuation of the drive unit, so that the grease in the syringes 21 can be pressured and supplied. As described above, the casing 15 has a sealed structure, and the internal pressure thereof is lower than 1 MPa (G). Accordingly, in order to supply grease to the bearings 14a, 14b of the turbine generator 2, the grease supply device 5 has to pressure the grease by a pressure which exceeds the internal pressure in the casing 15.

A first supply pipe 22 and a second supply pipe 23 are connected to the pair of syringes 21 respectively. The first supply pipe 22 connects one syringe 21 and the grease supply port C1 of the bearing support part 15c. The second supply pipe 23 connects the other syringe 21 and the grease supply port C2 of the bearing support part 15d. Accordingly, by operation of the grease supply device 5, grease is supplied to each of the bearings 14a, 14b provided in the turbine generator 2.

Figure 3:
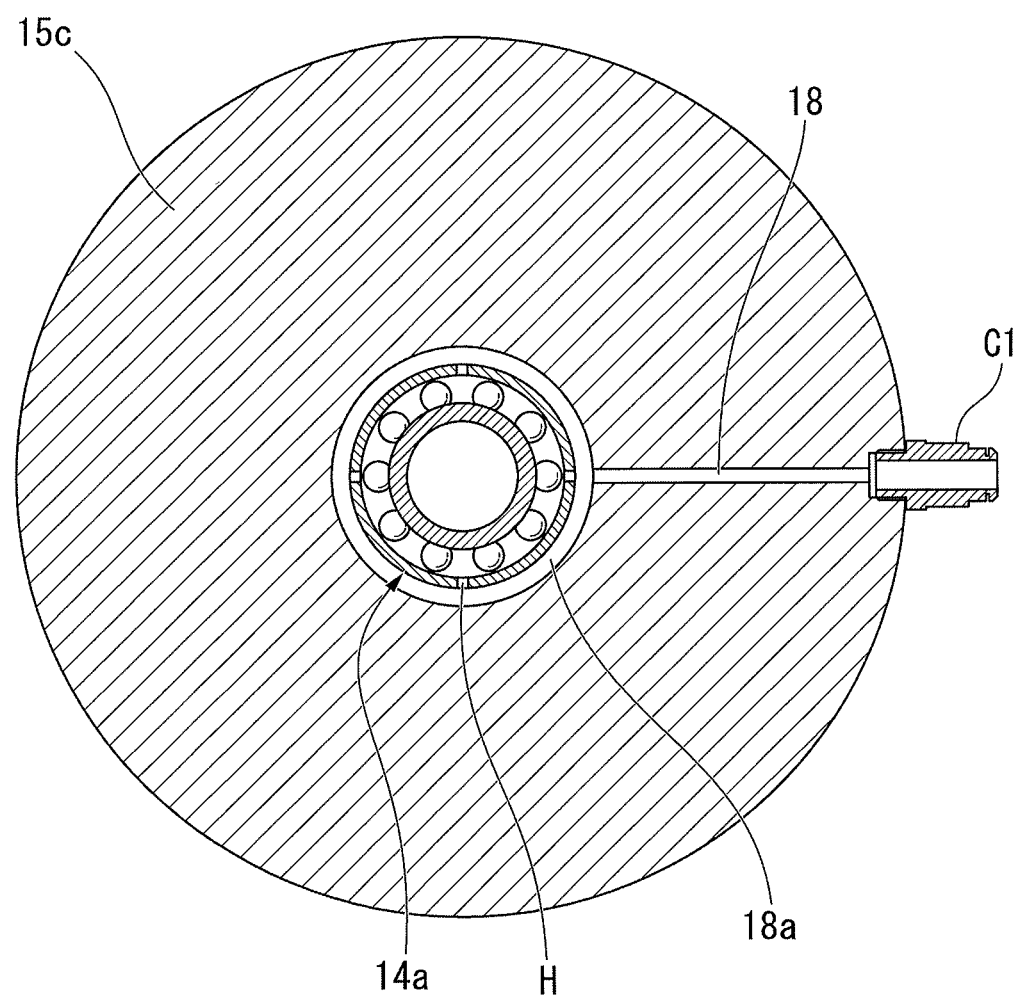
FIG. 3 is a cross-sectional view along line A-A in FIG. 2.

FIG. 3 is a cross-sectional view along line A-A in FIG. 2. As shown in FIG. 3, the bearing support part 15c is provided with an annular channel 18a so as to surround the bearings 14a. In the grease channel 18 explained using FIG. 2, one end thereof communicates with the annular channel 18a, and the other end thereof communicates with the grease supply port C1 provided on an outer periphery of the bearing support part 15c. Accordingly, the grease supplied from the grease supply port C1 through the grease channel 18 is distributed to the entire outer periphery of the bearings 14a, through the annular channel 18a.

Through-holes H (4 holes in FIG. 3) are formed in the outer ring of the bearings 14a so that the through-holes penetrate the outer ring in the radial direction thereof. Thus, the grease in the annular channel 18a is supplied to the inside (space between the outer and inner rings) of the bearings 14a through the through-holes H, whereby it is possible to maintain smooth rolling motion of rolling elements (balls).

In addition, the bearing support part 15d is provided with a similar annular channel to the annular channel 18a, so as to surround the bearings 14b, and the outer ring of the bearings 14b is provided with similar through-holes to the through-holes H. Accordingly, the grease in the annular channel, which has been supplied from the grease supply port C2 through the grease channel 19, is supplied to the inside (space between the outer and inner rings) of the bearings 14b through the through-holes, whereby it is possible to maintain smooth rolling motion of rolling elements (balls).

Figure 4:
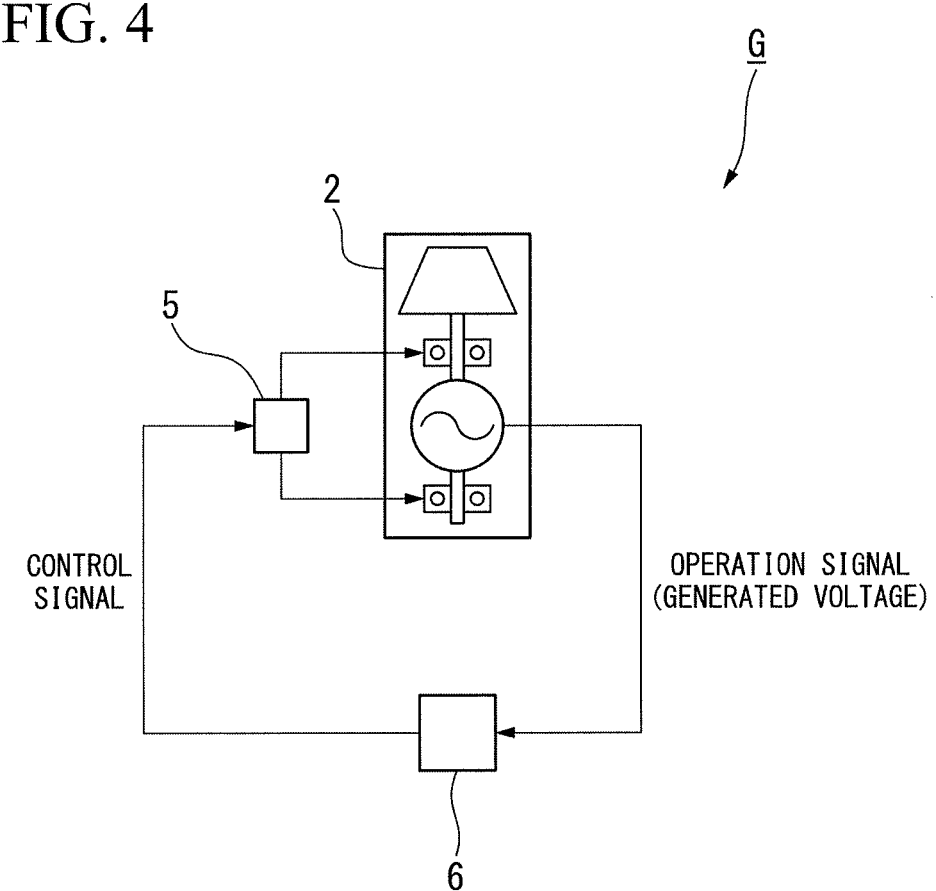
FIG. 4 is a block diagram schematically showing a control system of the waste heat power generator in the embodiment of the present invention.

FIG. 4 is a block diagram schematically showing a control system of the waste heat power generator in the embodiment of the present invention. As shown in FIG. 4, the waste heat power generator G further includes a controller 6 (controller) to control the grease supply device 5. The controller 6 sends control signals to the grease supply device 5, and controls the operation of the grease supply device 5, whereby the controller 6 can adjust the supply amount of the grease to the turbine generator 2.

The controller 6 controls the grease supply device 5 so as to periodically supply a fixed amount of grease to the turbine generator 2. In addition, the controller 6 controls the grease supply device 5 so that a supply amount of grease in one supplying operation becomes a small amount.

The grease newly supplied to the bearings (bearings 14a, 14b) which are provided in the turbine generator 2 has a high consistency because it has not been stirred well. When the grease having a high consistency is supplied to the bearings, a resistance to the rotation of the bearings is caused, and the temperature of the bearings or the grease therein increases by the resistance. As the amount of newly supplied grease is increased, the temperature of the bearings or the grease therein is significantly increased. Since the bearings or the grease have the proper operating temperature, if using in a state of exceeding the operating temperature, the deterioration of the grease proceeds and the lifetime of the bearings decreases. Accordingly, the raised temperature when supplying new grease to the bearings has to be retained at a temperature lower than or equal to the above operating temperature. The controller 6 controls the grease supply device 5 so that an amount of grease in one supplying operation becomes a small amount, in order to regulate the increase of temperature when supplying grease. The supply amount of grease in one supplying operation is properly set based on the proper operating temperature of bearings or grease, or the size of bearings (amount of contained grease).

Since base oil in grease is evaporated, the amount of grease in bearings gradually decreases. Accordingly, the grease has to be periodically supplied to the bearings. As the method to set intervals to supply grease, the following method is described.

After supplying initial grease to the bearings, in a case where the bearings are rotated without additional grease, the time to exhaust the lifetime of the bearings (seizing) is designated as a non-additional grease endurance time. If the grease is supplied by the supply amount to replace all grease contained in the bearings in the non-additional grease endurance time, the seizing of the bearings can be prevented. Thus, the supply intervals are calculated, such that the ratio of the grease supply amount in the one supplying operation to all the grease amount contained in the bearings is equal to the ratio of a supply interval to the non-additional grease endurance time. The controller 6 controls the grease supply device 5 so that the small amount of grease is supplied at the calculated supply intervals.

An operation signal of the turbine generator 2 (signal showing the electric output of the turbine generator 2, for example, a generated voltage) is inputted into the controller 6, and the controller 6 may adjust the supply amount of grease based on the operation signal.

When the rotational speed of the turbine generator 2 is high, the electric output thereof is increased. In other words, when the electric output of the turbine generator 2 is increased, the bearings are rotated at a high rotational speed. If the rotational speed of the bearings is high, the grease is stirred hard, and base oil thereof evaporates easily. That is, since the consumption amount of grease is increased, the supply amount of grease has to be increased. The controller 6 controls the grease supply device 5, so that the supply amount of grease is further increased by shortening a supply interval thereof, as the electric output of the turbine generator 2 is further increased.

As shown in FIG. 2, since the bearings 14a are provided in the vicinity of the scroll casing 15a to which the vapor produced at the evaporator 1 is supplied, the temperature of the bearings 14a is higher than that of the bearings 14b. Accordingly, the controller 6 may control the grease supply device so that the amount of grease supplied to the bearings 14a is more than the amount of grease supplied to the bearings 14b.

In the turbine generator 2 having the above structure, when the vapor produced at the evaporator 1 is supplied, the vapor is delivered from the inlet A1 of the scroll casing 15a through the scroll chamber A2 to the nozzle A3. The vapor supplied to the nozzle A3 is compressed so as to increase its pressure, and the impeller 11 is rotationally driven by the vapor whose pressure has increased. The expanded vapor after rotationally driving the impeller 11 is released from the outlet A4 to the outside, and is delivered to the condenser 3.

When the impeller 11 is rotationally driven, the rotational driving force thereof is transmitted to the generator 12 via the rotary shaft 13, and the rotor 12a of the generator 12 is rotated integrally with the impeller 11 and the rotary shaft 13. When the rotor 12a is rotated, the relative position between the rotor 12a and the stator 12b around the rotational axis thereof is changed, whereby, for example, three-phase alternate-current is generated. The generated electric power is outputted to the outside through the connector 16 and a cable (not shown).

The impeller 11, the rotor 12a of the generator 12, and the rotary shaft 13 are rotated at high speed (for example, several tens of thousands rpm), by using the vapor. With this, the bearings 14a, 14b are also rotated at high speed, and the grease supplied to the bearings 14a, 14b is stirred. In addition, heat is generated due to flow loss in the impeller 11 or operation of the generator 12. The heat is conducted to the bearings 14a, 14b, and the temperature of grease supplied to the bearings 14a, 14b is increased. By the effect of the stirring by rotation or the heat like this, the change of quality of grease or the deterioration thereof may be caused, and lubricating oil as base oil thereof may dry up. If the lubricating oil of grease dries up, the bearings 14a, 14b may become seized.

However, in this embodiment, the grease supply device 5 is provided, and moreover the turbine generator 2 is provided with the grease channels 18, 19 to supply grease to the bearings 14a, 14b. Thus, when a fixed amount of grease is periodically supplied to the bearings 14a, 14b, it is possible to maintain smooth rotation of the bearings 14a, 14b and to prevent problems such as seizing.

In addition, since the controller 6 controls the grease supply device 5 so that the supply amount of grease in one supplying operation becomes a small amount, the increased temperature at the bearings 14a, 14b when supplying grease can be regulated.

In this way, in this embodiment, the bearings 14a, 14b are lubricated using the grease supplied from the grease supply device 5. Accordingly, in this embodiment, it is not necessary to circulate lubricating oil in the related art, and the configuration to circulate lubricating oil, such as an ejector, a lubricating oil tank, a liquid-sending pump, pipes and the like, is not required. As a result, it is possible to efficiently generate electric power using the heat energy of low-temperature waste heat, without complicating its configuration and increasing its costs.

At manufacturing or maintenance of the turbine generator 2, the assembling work is performed to assemble the impeller 11, the generator 12, the rotary shaft 13, the bearings 14a, 14b, the casing 15 and the like. At this time, if supply pipes or the like to supply grease to the bearings 14a, 14b are provided inside the casing 15, work such as arrangement, routing, and connecting of the supply pipes is required, and thereby time and effort of assembling of the turbine generator 2 may be increased.

However, in this embodiment, the grease channels 18, 19 to supply grease to the bearings 14a, 14b are formed in the casing 15. Accordingly, in the assembling work of the turbine generator 2, when the grease channels 18, 19 formed in the casing 15 are filled with the predetermined amount of grease, and the rotary shaft 13, the bearings 14a, 14b and the like in sequence are fixed to the casing 15, the assembling work of the turbine generator 2 is completed. Thus, the work such as arrangement, routing, and connecting of supply pipes is not required, and time and effort of assembling of the turbine generator 2 at manufacturing or maintenance thereof can be reduced.

Though the waste heat power generator in the embodiment of the present invention has been described, the present invention is not limited within the above embodiment, and the modification thereof can be freely conducted within the scope of the present invention.

For example, in the above embodiment, an example has been described in which grease is supplied to the bearings 14a, 14b through the grease channels 18, 19 communicating with the grease supply ports C1, C2 respectively and through the annular channels provided in the peripheries of the bearings 14a, 14b. However, if there is no area to form the annular channel 18, grease may be supplied from a lateral side (one side of bearings in the central axis direction thereof) of each of the bearings 14a, 14b.

Figure 5:
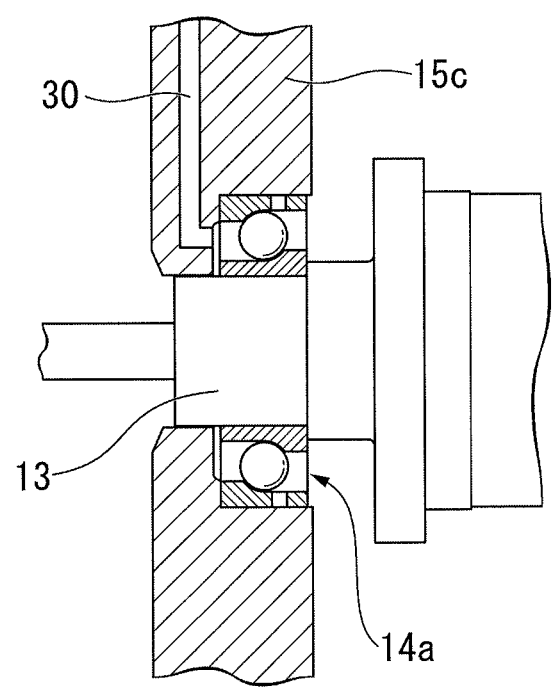
FIG. 5 is a cross-sectional view showing a modification of a grease channel in the turbine generator provided in the waste heat power generator in the embodiment of the present invention.

FIG. 5 is a cross-sectional view showing a modification of a grease channel in the turbine generator provided in the waste heat power generator in the embodiment of the present invention. In FIG. 5, the bearings 14a are described, but the bearings 14b can have same structure as that of the bearings 14a. A grease channel 30 described in FIG. 5 is an L-shaped channel in which one end thereof is arranged at a side of a lateral surface of the bearings 14a and the other end thereof communicates with the grease supply port C1 (not shown in FIG. 5). The grease channel 30 only has to be configured such that one end thereof is arranged at the side of the lateral surface of the bearings 14a and the other end thereof communicates with the grease supply port C1, and the grease channel 30 may be formed in a shape other than the L-shape.

Accordingly, the grease supplied from the grease supply port C1 through the grease channel 30 is supplied from the lateral surface side of the bearings 14a to the inside thereof (space between the outer and inner rings), whereby it is possible to maintain smooth rolling motion of rolling elements (balls). Additionally, in the example shown in FIG. 5, though the grease is supplied to the bearings 14a through a part (one end of the grease channel 30), there is no problem because the grease is delivered to the entire inside of the bearings 14a by rolling the rolling elements.

Furthermore, the grease channel 30 supplies grease from the lateral surface side of the bearings 14a, whereby the increased temperature of the bearings 14a or the grease therein when supplying grease can be regulated.

As described above, when new grease having a high consistency is supplied to the bearings 14a, the temperature of the bearings 14a is increased. If grease is supplied from the outer periphery side of the bearings 14a through the through-holes H, the grease having a high consistency directly contacts the rolling elements of the bearings 14a, and the temperature of the bearings 14a may be excessively increased. On the other hand, when grease is supplied from the lateral surface side of the bearings 14a, since there are spaces between the lateral surface side of the bearings 14a and the rolling elements so as to hold grease, new grease having a high consistency can be prevented from directly contacting the rolling elements, and the increased temperature when supplying grease can be moderated.

In the above embodiment, though the orientation in which the turbine generator 2 is installed is not especially described, the turbine generator 2 may be installed so that the rotary shaft 13 extends in the vertical direction and the impeller 11 is located above the generator 12 with respect to the vertical direction.

The pressure of the area surrounding the impeller 11 generally becomes approximately the intermediate pressure between the inlet pressure (pressure at the inlet A1) of the turbine and the outlet pressure (pressure at the outlet A4). Since the pressure at the outlet A4 is lower than the pressure of the area surrounding the impeller 11, the impeller 11 is drawn to the outlet A4 side (upper side in the vertical direction). On the other hand, the downward force in the vertical direction is applied to the impeller 11 by gravity. Since the force by the pressure difference and the force by gravity can be offset by each other, the thrust load on the bearings 14 can be reduced, and the lifetime of the bearings 14 can be extended.

In the above embodiment, the power-generating device using a centrifugal expansion turbine as an expander has been described as an example. However, the present invention can be applied to a power-generating device including a screw type expander or a rotary type expander.

Furthermore, in the above embodiment, though the waste heat power generator G generates electric power using the heat energy of the low-temperature waste heat of about 300 degrees C. or less released from factories, incineration facilities or the like, heat energy is not limited to the low-temperature waste heat, and the present invention can be applied to a general power-generating device to generate electric power using heat energy.

The invention claimed is:

1. A waste heat power generator comprising:
   an evaporator to recover heat energy and to produce a vapor of a working medium;
   a power-generating device to generate electric power while expanding the vapor;
   a condenser to condense the vapor which has passed through the power-generating device;
   a pump to send the working medium which has been condensed at the condenser to the evaporator; and
   a grease supply device coupled to the power-generating device to periodically supply the power-generating device with grease, which lubricates bearings provided in the power-generating device, during a period in which the power-generating device is driven.

2. The waste heat power generator according to claim 1, wherein
   the working medium is a medium whose boiling point is higher than or equal to 35 degrees C., and
   a pressure inside the waste heat power generator in operation is lower than or equal to 1 MPa by a gauge pressure.

3. The waste heat power generator according to claim 1, wherein
   the power-generating device includes:
   an impeller rotationally driven by the vapor;
   a generator driven by a rotational driving force of the impeller, so as to generate electric power;
   a rotary shaft to transmit the rotational driving force of the impeller to the generator;
   bearings rotatably supporting the rotary shaft; and
   a casing which accommodates at least the generator and the rotary shaft, and which is provided with a grease channel to supply the bearings with the grease from the grease supply device.

4. The waste heat power generator according to claim 3, wherein
   the grease channel includes:
   an annular channel being formed annularly around a rotational axis of the rotary shaft; and
   a channel in which one end thereof is communicated with the annular channel and the other end thereof is communicated with a grease supply port of the grease supply device.

5. The waste heat power generator according to claim 3, wherein
   one end of the grease channel is arranged in a side of a lateral surface of the bearings, and the other end of the grease channel is communicated with a grease supply port of the grease supply device.

6. The waste heat power generator according to claim 5, wherein
   the grease channel is formed in an L-shape.

7. The waste heat power generator according to claim 3, wherein
   the casing has a sealed structure, and
   the grease supply device pressures the grease by a pressure which exceeds an internal pressure in the casing, so as to supply the grease to the power-generating device.

8. The waste heat power generator according to claim 1, further comprising
   a controller to control the grease supply device, wherein
   the controller controls the grease supply device so as to periodically supply a fixed amount of grease to the power-generating device.

9. The waste heat power generator according to claim 8, wherein
   the controller adjusts a supply amount of the grease supplied by the grease supply device based on an electric output of the power-generating device.

10. The waste heat power generator according to claim 1, further comprising a controller configured to supply the grease to the power-generating device so that all grease contained in the bearing is replaced in a non-additional grease endurance time, which is a time from supplying initial grease to the bearing until the lifetime of the bearing ends in a case where the bearing is rotated without additional grease.

11. A waste heat power generator comprising:
    an evaporator;
    a power-generating device coupled to the evaporator and including a bearing;
    a condenser coupled to the power-generating device;
    a pump coupled to the condenser and the evaporator; and
    a grease supply device coupled to the power-generating device to supply grease periodically to the bearing therein during a period in which the power-generating device is driven.

12. The waste heat power generator according to claim 11, wherein the grease supply device periodically supplies a fixed amount of the grease to the bearing therein.

* * * * *